United States Patent [19]

Colman

[11] 4,403,136

[45] Sep. 6, 1983

[54] ARC WELDING GUN WITH HANDLE ASSEMBLY

[75] Inventor: William H. Colman, Cape Girardeau, Mo.

[73] Assignee: Lenco, Inc., Jackson, Mo.

[21] Appl. No.: 244,767

[22] Filed: Mar. 17, 1981

[51] Int. Cl.³ .............................................. B23K 9/00
[52] U.S. Cl. ................................ 219/137.31; 219/74; 219/137.63
[58] Field of Search ...................... 219/137.31, 137.63, 219/74; 38/90–92; 74/543; 403/13, 14; 174/17 VA

[56] References Cited

U.S. PATENT DOCUMENTS

| | | | |
|---|---|---|---|
| 1,269,106 | 6/1918 | Meredith | 38/90 |
| 1,678,310 | 7/1928 | Woodruff | 38/90 |
| 1,988,150 | 1/1935 | Austin | 403/13 X |
| 2,013,696 | 9/1935 | Olds | 38/90 |
| 2,024,371 | 12/1935 | Knapp | 38/90 |
| 2,144,474 | 1/1939 | Woodman | 38/90 |
| 2,158,868 | 5/1939 | Stacy | 174/17 VA X |
| 2,588,986 | 3/1952 | Reynolds | 38/90 |
| 4,297,561 | 10/1981 | Townsend | 219/137.63 |

FOREIGN PATENT DOCUMENTS 1427010 6/1973 United Kingdom .

OTHER PUBLICATIONS

Model #2, Tweeco Mig Gun Catalog #MG2-74 5/74, Brochure Tweeco Co., Wichita, Kansas.

Primary Examiner—Elliot A. Goldberg
Attorney, Agent, or Firm—Haverstock, Garrett & Roberts

[57] ABSTRACT

A welding gun handle assembly connectable to a supply cable supplying a consumable welding electrode, shielding gas and electrical power, all under the control of a trigger operated switch in the handle assembly including a relocatable thumb rest which may be attached on either side of the handle assembly above the trigger of the switch so that the trigger may be operated in a natural manner by both right and left handed operators, a grip portion having finger grooves for placing at least one finger over the trigger of the switch, cooling vents through the handle assembly to permit circulation of cooling air therethrough, connection apparatus for connecting the welding gun to the supply cable, a gooseneck assembly and an adapter on the handle for connection therewith and a replaceable liner for guiding the consumable welding electrode from the connection apparatus to the welding gun, through the removable gooseneck.

6 Claims, 6 Drawing Figures

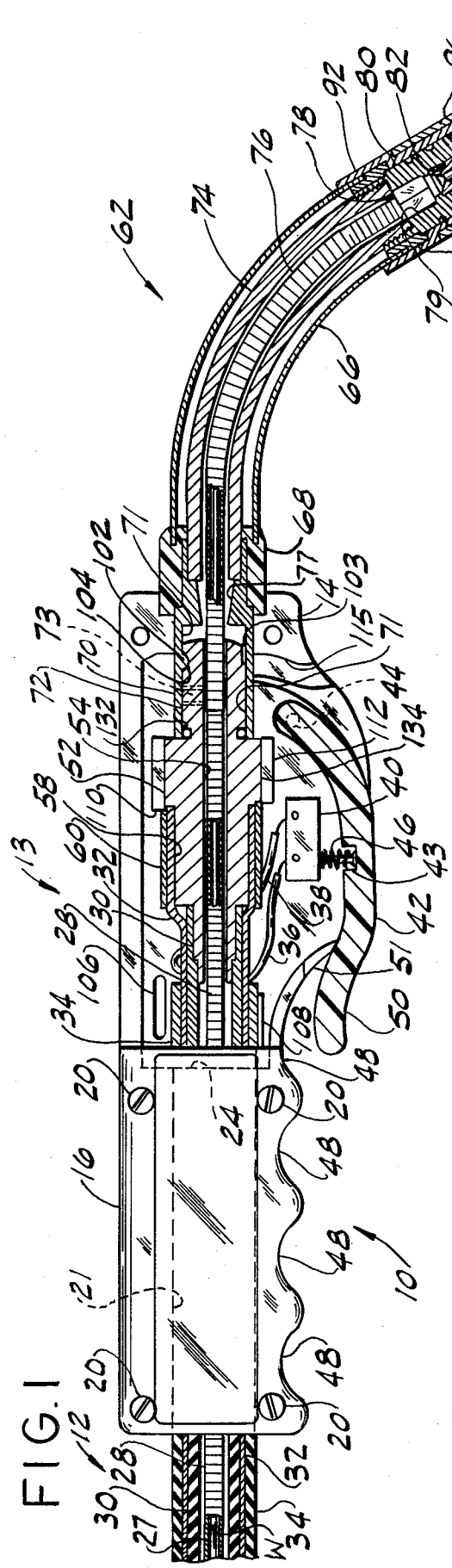
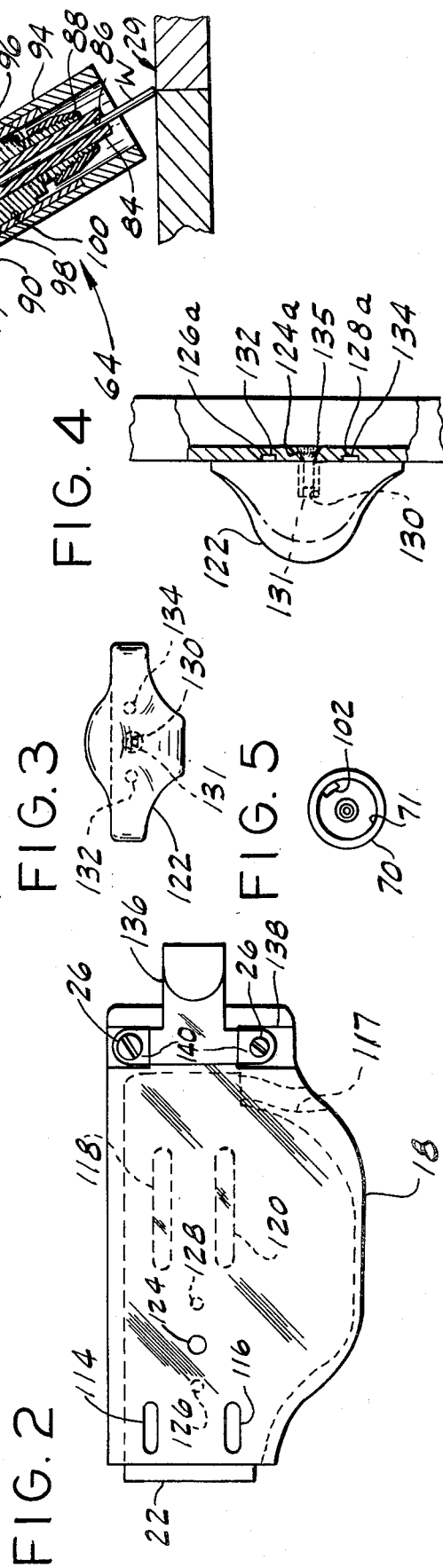
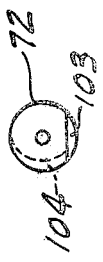

ARC WELDING GUN WITH HANDLE ASSEMBLY

The present invention relates to a handle assembly for use with an arc welding gun, and especially a gas-metal arc welding (GMAW) gun, sometimes known as a metal inert gas (MIG) gun, supplied with a consumable welding electrode, a a supply of shielding gas and electrical power supplied through a supply cable from a welding machine, operation of the welding gun being controlled by a switch located on the handle assembly.

It is known in the art to use a welding gun which controllably feeds a consumable welding electrode in the form of a thin welding wire through a gooseneck and nozzle assembly to a welding location and wherein the nozzle assembly is also connected to emit a shielding gas for shielding the welding location from the gases of the atmosphere. The welding electrode, shielding gas and electrical power required for a welding operation are supplied from external sources such as a wire feed machine through a supply cable to the welding gun and through the nozzle assembly. It also is known in the art to provide a control switch on the GMAW gun with control leads from the switch extending through the supply cable to the wire feed machine, said switch being used for controlling the feeding of the welding electrode, the shielding gas and the electrical power to the welding location.

Prior art welding guns having handle assemblies with control switches and other features which are considered to be the most pertinent prior art to the present device are shown in Irniger U.S. Pat. No. 3,239,647; dal Molin U.S. Pat. No. 3,544,758; dal Molin U.S. Pat. No. 3,610,875; Kester et al U.S. Pat. No. 3,629,547 and dal Molin U.S. Pat. No. 3,783,233. All of these patents show welding guns with control switches located such that actuation of the control switch and support of the device, which devices are usually relatively heavy, are relatively awkward, uncomfortable and tiring. In the Irniger patent, the control switch is at the top and on the center axis of the welding gun requiring the welder to move his thumb in an awkward, unnatural manner to the top center of the welding gun during welding operations. In the dal Molin and the Kester et al patents, the control switch is located at the bottom of the welding gun where it must be squeezed and held squeezed during operation by at least one finger of the operator's hand. In order to close the switch using the known devices the operator must either tighten his grip on the welding gun and hold the grip for long periods or move his thumb to the top of the welding gun so that he may squeeze the trigger between his thumb and finger. The placing of the thumb on the top of the welding gun is awkward and fatiguing to the operator, especially if he must maintain the switch closed for long periods such as when making a long continuous weld. When the switch is located at the bottom of the welding gun, as in some of the prior art devices, the operator may place his thumb along the side of the welding gun, in a more natural position, but the operator must periodically tighten and relax his grip in order to manipulate the switch. The relaxing of his grip may cause the operator to lose control of the welding gun resulting in poor gun control and inferior welding operations.

The present handle assembly for a welding gun provides an improved grip portion having a relocatable thumb rest that can easily and quickly be relocated thereon to facilitate better use by both right and left handed operators allowing an operator to grasp the handle assembly in a more natural and less tiring manner thereby giving the operator improved control and support of the welding gun and easier and more effective control of the trigger.

It is therefore a principal object to provide an improved handle assembly for welding guns and the like.

Another object is to provide a welding gun handle assembly having improved thumb support means to enable better manipulation of the gun assembly and improved control of the trigger operating means.

It is another object of the invention to provide a thumb rest which may alternatively be located on either opposite side of a welding gun assembly to facilitate and improve operation by right as well as by left handed operators.

It is another object of the invention to provide a welding gun handle assembly having a grip which automatically locates at least on one finger of the operator's hand over the control switch trigger.

It is another object to provide a quick disconnect coupling between the gooseneck assembly and the handle assembly of a welding gun.

Another object is to provide improved venting for cooling purposes in the handle assembly of a welding gun.

Another object is to provide a handle assembly having means to allow easy access to the control switch without requiring substantial disassembly.

A further object is to provide a welding gun which allows relatively easy access for replacement of the wearable parts and without substantial disassembly.

These and other objects and advantages of the present device will become apparent after considering the following detailed specification in conjunction with the accompanying drawings wherein:

FIG. 1 is a fragmentary partially sectioned view of a welding gun and attached supply cable constructed according to the present invention;

FIG. 2 is a side elevational view of the switch access panel of the welding gun handle assembly of the present invention;

FIG. 3 is a side elevational view of a thumb rest for use on the present construction;

FIG. 4 is a fragmentary partially sectioned view showing the connection of the thumb rest of FIG. 3 to one side of the welding gun handle assembly of the present invention;

FIG. 5 is a left end view of the connector member of the removable gooseneck for making the connection between the welding gun handle and the removable gooseneck of FIG. 1; and, FIG. 6 is a right end view of the connector member of the welding gun handle for making the connection between the welding gun handle and the removable gooseneck of FIG. 1.

Referring to the drawing more particularly by reference number, number 10 identifies on GMAW gun connected to a supply cable 12 for supplying a consumable wire electrode W, shielding gas and electrical power to the welding location. The welding gun 10 includes a handle assembly 13 having a one-piece left housing member 14 and a two-piece right housing portion including a right gear housing member 16 and a right front housing member 18 (FIG. 2). The right rear housing member 16 attaches to the one-piece left housing member 14 by threaded members 20 which are shown mounted in counterbored openings. An appropriate passageway 21 is provided between the right rear housing member 16 and the adjacent portion of the left housing member 14 such that when the housing members 14 and 16 are fastened together with the threaded members 20, the supply conductor 12 is clamped therebetween as shown in FIG. 1.

The right forward housing member 18 (FIG. 2) is fastened in place by inserting a rearwardly extending flange portion 22 into a cavity 24 provided therefor in the end of the right rear member 16. The connection of the housing member 18 to the housing member 14 is completed by means of other threaded members 26.

The welding supply cable 12 includes a flexible tubular liner 28 having a continuous passageway 27 therethrough through which a consumable wire welding electrode W from a welding supply machine passes to a welding location at 29. Around the outside of this liner core 28 in the cable 12 is a gas conduit 30 of a suitable flexible material for conducting the shielding gas through the cable 12 to the welding gun 10 and to the welding location 29. A stranded conductor 32 in the cable 12 surrounds the gas conduit 30 and forms a flexible electrically conductive layer that is used for supplying the electric power for the welding operation. The cable 12 is enclosed in another sheath 34 of a gas sealing and moisture sealing material that is flexible, somewhat resilient and electrically non-conductive to form a gas and water tight covering for the cable 12. This sheath 34 also serves as an insulator to prevent the operator from being exposed to the electric welding current. Intertwined in the stranded electrical conductor layer 32 are two insulated control leads 36 and 38 which are for connecting control means on a wire feed machine to a control switch 40 on the handle assembly 13. When the switch 40 is actuated, the wire feed machine supplies the shielding gas, the consumable electrode W and the welding power to the supply cable 12 and to adjacent the welding location 29.

The control switch 40 is normally opened, and is closed by operation of a trigger 42 which is pivotally attached to the handle assembly 13 at 44. The trigger 42 is biased towards the open position by a spring member 46 which extends between the body of the switch 40 and a cavity 43 in the trigger 42. The right front housing member 18 provides a convenient easy to open switch access panel which allows access for repair and/or maintenance of the switch 40 and associated parts without usually requiring any other disassembly of the structure.

The right rear housing member 16 and the rear portion of the left housing member 14 cooperate to form finger grooves 48 on the lower rear portion of the assembled housing. This provides a natural, comfortable grip for three of the operator's fingers leaving the index finger free to extend over the curved end portion 50 of the trigger 42 where the trigger protrudes from the handle assembly through a slot 51 formed by and between the housing members 14 and 18.

The welding supply cable 12 terminates between the housing members 14 and 18 and is connected to an electrically conductive male connector member 52 which has a bore 54 therethrough for receiving the flexible tubular liner 28 of the supply cable 12. The male connector member 52 has a step shaped cross-section as shown including having an annular extension on one end over which the end portion of the tubular gas conductor 30 is positioned. The member 52 also has a shoulder portion 58 over which is placed a portion of the stranded electrical conductor 32. In order to make the connection, a portion of the end of the outside sheath 34 is removed from the cable 12 a sufficient distance to allow the ends of the insulated control leads 36 and 38 to be drawn out from the stranded conductor layer 32 for connection to the terminals of the switch 40 as shown in FIG. 1. A compression ring 60 clamps the stranded conductor 32 around the shoulder portion 58 of the male conductor member 52 to make good electrical contact between the stranded conductors of the layer 32 and the male connector member 52.

At the opposite end of the GMAW gun 10 from the supply cable 12 is a removable gooseneck assembly 62 having at its outermost or free end a nozzle assembly 64. The gooseneck assembly 62 has an outer tubular jacket 66 connected at one end to an insulator bushing 68 which is in turn connected to an electrically conductive connector member 70. The connector 70 is tubular and forms a bore 71 sized to accept an electric connection with forward extension 72 of the connector member 52. A tubular conductor 74 is also connected, as by silver soldering, to the connector member 70 and extends within the jacket 66 from the connector member 70 to the nozzle assembly 64. A tubular wire guide, also referred to as replaceable liner 76, is located extending through tubular conductor 74. The liner 76 is made sufficiently long to extend into the connector member 70 and is sized to extend partway through the central bore 54 to about the end of the flexible liner 28 in the supply cable 12. The replaceable liner 76 passes from the tubular conductor 74 to the bore 71 through a passageway 77 whose walls are tapered to guide the replaceable liner 76 into the central bore 54. The end of the liner 28 is held in place in the central bore 54 by a set screw 73 through the expension 72 of the connector member 52. A spacer 78 is positioned in the nozzle assembly 64, over the liner 76, and the opposite end of the liner 76 extends through the spacer 78.

The nozzle assembly 64 is attached to the end of the gooseneck assembly 62 such that it is compressed against the end of tubular jacket 66 and has a gas diffuser member 80 threaded on the tubular conductor 74. The diffuser 80 has a central bore 82 therethrough and a communicating counterbore 79 in to which is located the spacer 78. A contact tip 84, having a central bore 86 therethrough, is located in the bore 82 through the gas diffuser member 80, and receives in its end, the end portion of the replaceable liner 76. The contact tip 84 is connected to the gas diffuser member 80 by a compression nut 88 threaded around the end of the gas diffuser member 80 as shown. It can thus be seen that a continuous passageway is provided for a consumable welding electrode W. The passageway is through the center of the flexible liner 28 of the supply cable 12, through the replaceable liner 76 of the gooseneck assembly 62, and from there through the central bore 86 of the contact tip 84 thereby passing through the nozzle assembly 64 to the welding location 29.

A jacket insulator 90 extends around the end of gas diffuser member 80 outwardly of the end of the tubular conductor 74 to electrically insulate the conductor tube 74 from the jacket 66. Another insulator 92 for the nozzle assembly 64 has an enlarged end portion for receiving the end of the jacket 66. The insulator 92 also cooperates with the gas diffuser member 80 along a major portion of its length. A metal nozzle member 94 is provided on the outer surface of the nozzle insulator 92, being electrically insulated from the diffuser 80 by the insulator 92. A plurality of radial bores 96 are formed in the gas diffuser member 80 to provide communication between the central bore 82 and the space between the gas diffuser member 80 and the nozzle insulator 92 including the nozzle member 94. Thus, a continuous passageway is provided for the shielding gas which is supplied from a source (not shown) connected to the inlet end of the cable 12. The passageway through the connector member 52 and into the socket 71 of the connector member 70, through the central passageway of the tubular guide 74, around the sides of the spacer 78, through the counterbore 79, around the outer surface of the contact tip 84, into the central bore 82 of the gas diffuser member 80, and from there through the radial bores 96 for discharging from the end of the nozzle member 94. The gas being emitted therefrom extends around the shields the welding location 29 including the free end of the welding electrode W. The outer nozzle member 94 and nozzle insulator 92 are held in place on the gas diffuser member 80 by snap rings 98 and 100 positioned in grooves that extend around the gas diffuser member 80.

A key member 102 projects from the inside surface of the bore 71 in the connector member 70 (FIG. 5) and a portion of the free end of the extension 72 of the connector member 52 is removed to form a keyway 103. An annular groove 104 extends partway around the outside circumference of the extension 72 and is in communication with the keyway 103. The gooseneck assembly 62 is oriented such that the key 102 is able to pass through the keyway 103 to the annular groove 104. After the connector member 70 is seated around the extension 72 of the connector member 52 with the key 102 in the groove 104, the gooseneck assembly 62 including the connector member 72 and the key 102 is rotated until the key 102 reaches the end of the groove 104, locking the gooseneck assembly 62 to the handle assembly 13. The extension 72 has a camming action between the outside surface of the extension 72 and the bore 71 through the connector member 70. An O-ring 132 provides a gas seal between the connector member 52 and connector member 70 when the gooseneck assembly 62 is connected to the handle assembly 13.

The principal wear part in the present assembly is the replaceable liner 76 through which the welding electrode W passes. When the replaceable liner 76 needs to be replaced, it can be easily replaced by removing the nozzle assembly 64 from the gooseneck assembly 62 by slidably removing the nozzle insulator 92. The gas diffuser member 80 can then be unscrewed from the conductor 74, and the worn liner 76 is removed and replaced. The nozzle assembly 64 and the gas diffuser 80 are thereafter reassembled. The contact tip 84 can also be easily replaced by slidably removing the nozzle insulator 92 and the nozzle member 94 from the nozzle assembly 64 and then unscrewing the gas diffuser nut 88 allowing the contact tip 84 located in the bore 82 to be removed and, if necessary, replaced.

Electrical energy for welding is supplied to the consumable electrode W by way of the stranded cable conductor 32. This is supplied to the connector member 52, the conductor member 70, the tubular conductor 44, the gas diffuser 80 and the control tip 84. The consumable electrode W receives welding power only when it is moved into electrical contact with the work which completes the circuit to the opposite or ground side of the power source. If the liners 28 and 76 are made of electrically conductive metal, the electrode W will also receive power therefrom.

Rear vent slots 106 and 108 are provided in the left housing member 14, and rear vent slots 114 and 116 are provided in the right front housing member 18. A front vent is provided by a front vent slot 115 in the front of the left housing member 14 in registry with a front vent slot 117 in the right front housing member. The vent slots 106, 108, 114, 115, 116 and 117 are positioned to permit air circulation through and around the inner portions of the housing to help cool the electrical connections in the handle assembly 13. This particular arrangement of slots is desirable because the slots are located so as not to be totally blocked by the hand of the operator and are located to maximize the dissipation of heat from the GMAW gun by circulation of air through the gun handle.

Protrusions 110 and 112 are molded into the inside of the left housing member 14 and protrusions 118 and 120 are molded into the inside of the right front housing member 18 to conform to the shape of the middle portion 134 of the connector member 52 for holding the connector member 52 in place and to prevent rotation of the connector member 52 when the removable gooseneck 62 is rotated into place.

A thumb rest member 122, which may alternatively be attached to either opposite side of the handle assembly 13, is also provided. The thumb rest 122 is an elongated member that projects from the desired side of the handle assembly 13 at a location to provide a comfortable natural thumb support and a better grip. The position and shape of the thumb rest 122 also enables the operator to more easily and accurately manipulate the gun. For left handed persons the attachment of the thumb rest 122 may be made through a mounting hole 124 formed in the right front housing member 18 and for right handed persons through a mounting hole 124a in the left housing member 14 (FIG. 4). The right front housing member 18 is also provided with spaced alignment depressions 126 and 128 located on opposite sides of the mounting hole 124, and the left housing member 14 is provided with a similar set of spaced alignment depressions 126a and 128a located on opposite sides of the mounting hole 124a. As shown in FIG. 4, the thumb rest 122 has a bore 130 into which is ultrasonically welded a threaded insert 131. When mounting the thumb rest 122 on the left side of the welding handle assembly 13 for a right handed operator, the bore 130 and the threaded insert 131 therein are placed in alignment with the hole 124a and spaced projections 132 and 134 on the thumb rest 122 are placed in cooperation with the respective depressions 126a and 128a. A threaded member such as screw 135 is then positioned extending through the mounting hole 124a for cooperation with the threaded insert 131. For a left handed operator, the thumb rest 122 is similarly mounted on the right side of the housing by means of the mounting hole 124 and the depressions 126 and 128. Attaching the thumb rest can be accomplished relatively quickly and easily using only simple hand tools.

A hanger hook 136 is optionally connected to the handle assembly 13 by means of a hook extension 138 with holes 140 therethrough through which the threaded member 26 passes. The hook 136 is used for hanging up the gun when not in use so that it will be less likely to be damaged.

The subject improved welding gun and handle assembly make for a more comfortable, easier to hold and manipulate construction, which construction can be easily converted for use by right and left handed operators. The subject construction also has improved relatively safe means for making the connections in the handle and gun portions for the supply of the welding electrode, the electric energy and the shielding gas. The improvements are especially adaptable for use in welding guns such as GMAW or MIG guns but they are also applicable to other types of welding guns as well including TIG guns and other welding guns wherein shielding gas and electrical energy are required.

Thus there has been shown and described a novel handle assembly for an arc welding gun which fulfills all of the objects and advantages sought therefor. It will be apparent to those skilled in the art, however, that many changes, modifications, variations, and other uses and applications for the subject device are possible and all such changes, modifications, variations, and other uses and applications which do not depart from the spirit and scope of the invention are deemed to be covered by the invention which is limited only by the claims which follow.

What is claimed is:

1. A handle assembly in a welding gun comprising a housing having spaced opposite side walls and connected first and second housing portions, a removable access panel to at least one of the housing portions, first connection means at one end of the housing for receiving one end of a supply cable having means therein for the passage of a consumable welding electrode, shielding gas, and electrical power, second connection means at the opposite end of the housing, a nozzle assembly having a first end for connecting to the connection means at said opposite end and a free end defining a welding location, means for feeding and directing the consumable welding electrode, the shielding gas, and electrical power through said supply cable, said housing and the nozzle assembly to the welding locations, switch means in said first housing portion having a trigger member pivotally mounted thereon with a portion protruding therefrom for operation to control the feeding and directing of the consumable welding electrode, the shielding gas and electrical power to the welding location, said second housing portion having a handle portion extending thereon to adjacent the protruding portion of said trigger member to be grasped by the hand of an operator such that at least one of the operator's fingers extends over the projecting portion of said trigger member, and a thumb rest member attached to the housing in position to provide support for the operator's thumb, said thumb rest member and said housing on each opposite side thereof having cooperatively engageable means which enable the thumb rest member to be detached from one side for mounting on the opposite side of the housing depending on whether the operator is right or left handed, said cooperatively engageable means including a hole in the thumb rest member and a hole through each opposite side wall of the housing in position to register with the hole in the thumb rest member when positioned thereagainst, threaded means cooperatively engageable with the hole in a selected one of the side walls of the housing and with the hole in the thumb rest member, and other cooperatively engageable means on the thumb rest member and on each opposite side of the housing in position to become engaged with each other when the threaded means are drawn tight, and vent openings through the spaced housing walls communicating the space in the first housing portion to ambient air to allow air to circulate through the first housing portion.

2. The handle assembly of claim 1 wherein said handle portion of the housing has grooves formed therein for engagement by the operator's fingers.

3. The handle assembly of claim 1 wherein the nozzle assembly is removably connected to said handle assembly.

4. The handle assembly of claim 3 wherein said first connection means at said one end of the housing includes a tubular member having a passageway therethrough for receiving the consumable welding electrode from said supply cable, said nozzle assembly having a passageway therethrough communicating with the passageway through said connection means, and a flexible tubular liner member extending through the nozzle assembly in position to conduct the welding electrode to the welding location.

5. The handle assembly of claim 1 including switch means located in the first housing portion including switch operator means engageable with the trigger member, said access panel on said housing being located to provide access to the interior of the first housing portion and to the switch means located therein.

6. In a welding gun assembly, an improved grip and trigger assembly comprising an elongated housing having connected first and second end portions with finger grooves formed on one side of the first end portion and a trigger member pivotally mounted on the housing in the second end portion, said housing having spaced opposite side walls each having an opening therethrough communicating the space between the side walls in the second housing portion to atmosphere, a removable panel attached to the housing adjacent to the second end portion for providing access thereto, spaced locating means in the spaced opposite side walls in the second housing portion including a location opening, a thumb rest member having an opening therein and spaced locating means thereon, the opening in the thumb rest member being registrable with the locating opening in a selected one of the housing side walls, and means engageable with the openings in the thumb rest member and with the selected opening in the housing side walls to enable threadedly fastening the thumb rest member to opposite sides respectively of the housing.

* * * * *